United States Patent

Gonzalez

[11] Patent Number: 5,904,462
[45] Date of Patent: May 18, 1999

[54] STRUCTURAL BEAM LOCKING BOLT

[76] Inventor: Maximo Gonzalez, 572 N. Loucks, Aurora, Ill. 60505

[21] Appl. No.: 09/098,939

[22] Filed: Jun. 17, 1998

[51] Int. Cl.$^6$ ............................. F16B 19/00; F16B 21/00
[52] U.S. Cl. ........................... 411/342; 411/341; 411/508
[58] Field of Search .................... 411/340, 341, 411/342, 343, 344, 345, 508, 509

[56] References Cited

U.S. PATENT DOCUMENTS

| | | | |
|---|---|---|---|
| 79,801 | 7/1868 | Adams | 411/341 X |
| 577,285 | 2/1897 | Caugherty | 411/342 X |
| 1,073,998 | 9/1913 | Lundin | 411/342 |
| 1,659,992 | 2/1928 | Crone | 411/342 |
| 1,805,138 | 5/1931 | Fredendall | 411/342 |

*Primary Examiner*—Neill Wilson
*Attorney, Agent, or Firm*—John L. Schmitt

[57] ABSTRACT

A locking bolt for helping make connections between beams and columns of a building under construction includes an elongated body having a rear threaded section. This threaded section connects with a smooth toggle section having a rounded front end. An inverted L-shaped slot in the toggle section includes a deep front recess that connects with a shallow rear recess. A toggle bar is carried in the slot by a pivot pin that extends loosely through an opening in a base of the toggle bar. Connecting with the toggle base is a rearward extending locking arm. When the toggle bar locking arm seats in the slot, the front end of locking bolt may readily pass through bolt holes in a beam and a web of an adjoining column. Once the toggle bar is clear of the column web, the toggle bar locking arm is free swing from the slot and into a locking mode where held by interference fits between edge segments of the toggle bar base and walls of the slot deep recess. In this mode the beam and column are conditionally joined by tightening a nut on the bolt threaded section so that an end edge of the toggle bar locking arm engages the column web.

10 Claims, 2 Drawing Sheets

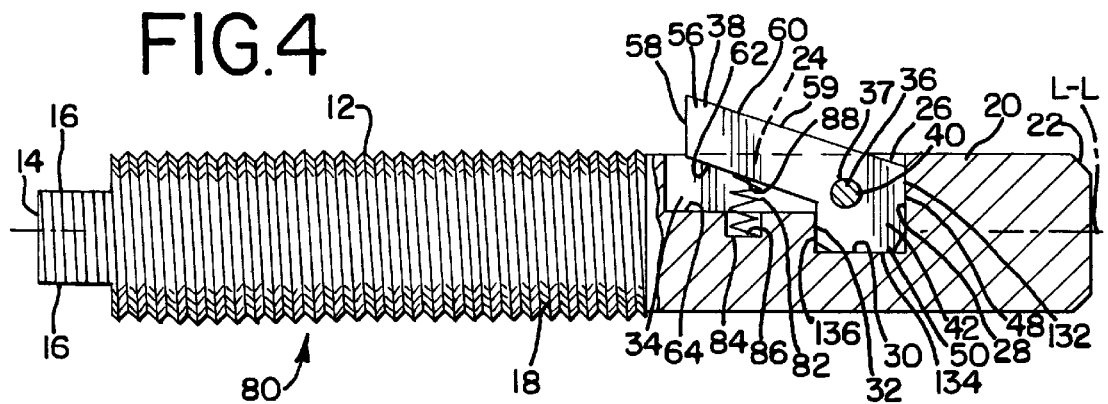
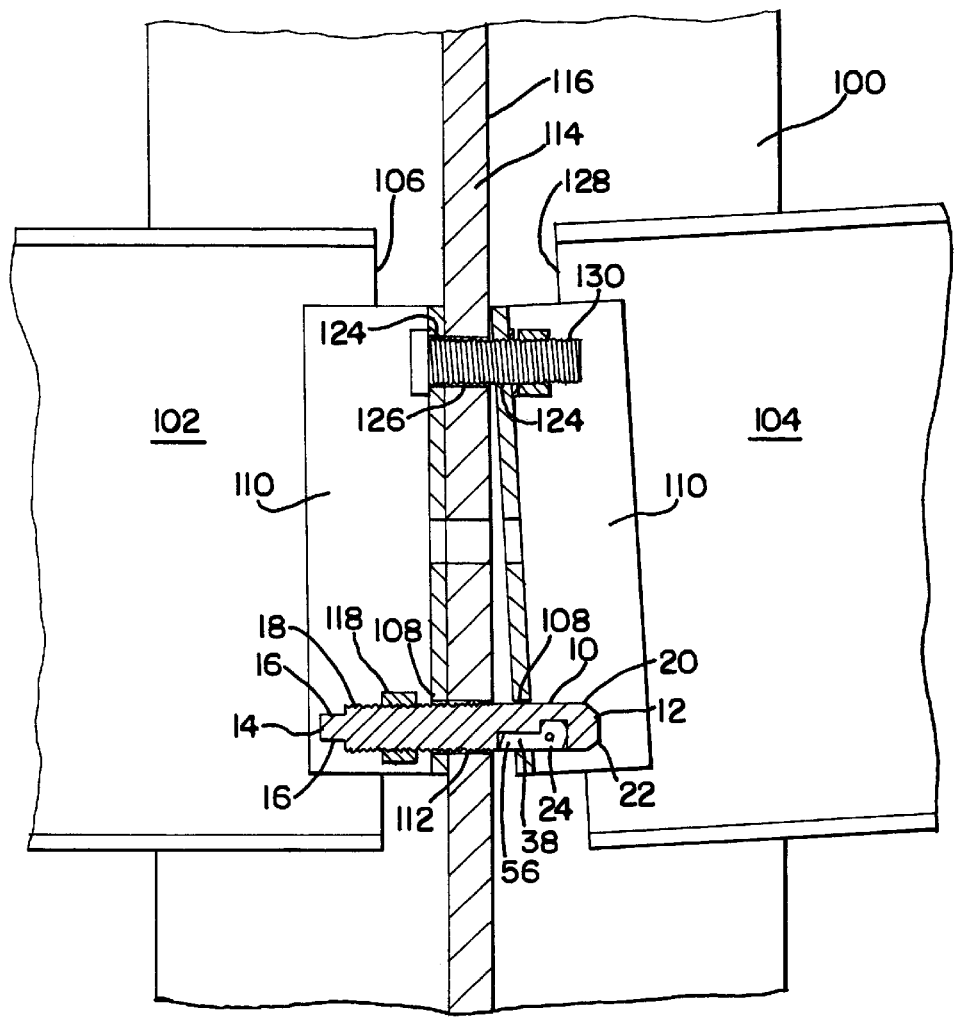

STRUCTURAL BEAM LOCKING BOLT

BACKGROUND OF THE INVENTION

1. Field of Invention

This invention relates generally to fastening devices that simplify joining structural members of a building under construction and more particularly to a locking bolt adapted to aid making a connection between a vertical column and horizontal beams.

2. Prior Art

Difficulties of joining structural members during erection of a building have long been recognized and continue because there is no universally accepted solution.

One example of an assembly particularly adapted for joining sections of structural angle is shown in U.S. Pat. No. 3,499,258. On ends of the angle sections to be joined are block-shaped fittings that extend beyond the respective angle ends. Each fitting has a calibrated hole positioned between a pair of plain holes. With the fittings placed end-to-end, a drift pin is inserted through the now aligned calibrated holes. Nut-bolt assemblies then are placed in the fitting plain holes to hold the fittings and related angle sections together.

U.S. Patent No. 4,254,542 then discloses a nut and bolt assembly for forming an initial loose connection between a horizontal floor beam and a vertical column of a building under construction. The bolt has a hex-shaped head on an end of a large diameter shank portion. This shank portion then is connected to a small diameter threaded end by a tapered section. Because the threaded end of the bolt has a diameter smaller than an opening in a column, initial alignment between the bolt and column opening need not be exact. Once inserted, the bolt is held in place by a nut having a sleeve that fits against a web of the column.

Additionally, locking-type fasteners that include a toggle have been known and in use for many years.

One early locking-type fastener is set out in U.S. Pat. No. 1,075,759 and includes a headless cylindrical body. Near an outer end of the body are perpendicularly offset, transversely positioned long and short slots. A locking lever is pivotally secured in the long slot by a pivot pin having ends slidably disposed respectively in the short slots. The lever pivot pin is longitudinally offset to be closer to an inner end of the lever. For use an outer end of the fastener passes through an opening in a support structure, such as a wall, until the inner end of the locking lever clears an inner side of the wall. Because of the lever pivot is offset, the lever then rotates from the long slot. Next, the fastener body is drawn inward. Serrations on a bottom edge of the lever seat against the wall inner side as a top edge of the lever fits against an outer end of the long slot.

U.S. Pat. No. 1,340,470 discloses another locking-type bolt having a threaded, cylindrical-shaped body. On each side of an outer end of the body is a recess having an L-like shape. One recess faces up while the other recess faces down. Pivotally secured in each recess is a complementary shaped toggle. For use the body of the bolt is pressed through aligned openings in spaced apart inner and outer plates, for example. Once the toggles clear an inner side of the inner plate, the toggle in the downward facing recess rotates out of its recess. The bolt then is secured by seating the rotated toggle against the inner plate. Once seated, toggle rotation is inhibited by contact between a shoulder of the toggle and a shoulder of its recess.

SUMMARY OF THE INVENTION

A locking bolt of this invention is particularly adapted to facilitate joining ends of horizontal beams to opposite sides of a vertical column of a building under construction. The bolt includes an elongated, cylindrical shaped body having a rear threaded section that connects with a front smooth toggle section. In the toggle section is an inverted L-shaped slot defined by a deep, box-shaped front recess having spaced apart end walls connected by a bottom wall. A shallow, rear recess then joins the front recess. Pivotally secured in the slot is a complimentary shaped toggle bar having a base connected to a locking arm. The toggle bar base includes a front and rear end edge segment that are spaced apart by a bottom edge segment. A rear end edge of the toggle bar locking arm is positioned parallel to the toggle bar base end edge segments and perpendicular to the bottom edge segment.

Construction of a building typically begins with erection of a series of spaced apart vertical columns. These columns then are connected by vertical spaced apart horizontal beams. This inventive locking bolt simplifies the beam-column connecting procedure.

With a first end of a first horizontal beam attached to a first column, the locking bolt secures a second end of that first beam to a second column. This securement is achieved by inserting the bolt toggle section through an opening in an attaching angle on the first beam second end and through an opening in a web of the second column. Once the locking bolt toggle section is clear of the column web and if the bolt slot is facing down, the locking arm of toggle bar swings out of the slot. This downward rotation of the toggle bar is limited to about 20 degrees by respective contact of the toggle bar base end and bottom edge segments with the bolt front recess end walls and bottom wall. As located, the toggle bar locking arm rear end edge is positioned perpendicular to a longitudinal axis of the bolt so that the toggle bar locking arm end wall aligns with the column web. Next, a nut on the bolt threaded section is tightened to draw the toggle arm locking arm tightly against the column web. The bolt holds the second end of the first beam and column together as a first end of a second beam is attached to an opposite side of the column.

The locking bolt of this invention offers several advantages.

First, this inventive locking bolt concurrently provides two necessary functions to the beam-column connecting procedure. The locking bolt tentatively holds the unattached end of the partially attached first beam to the second column. Also, the locking bolt serves as a guide for locating the unattached end of the second beam. Theretofore an nut and bolt were used to secure the first beam to the column, but this nut and bolt had to be removed before the second beam could be attached to the column.

To appreciate the importance of this dual functionality, it must be understood that beam-column connections are made well above ground level and by hand by a worker positioned on the unattached end of the first beam. The locking bolt must be readily insertable and then prepared to hold the first beam second end and the column together. The bolt rounded front end, smooth surface of the toggle section, and full encasement of the toggle bar enhance ready insertion. If the toggle bar were not encased, as for example the bolt slot were facing down, a fully exposed toggle bar would not inhibit insertion. Note the shallow angle of incidence upon contact between the toggle bar and the opening in the first beam second end. This shallow angle insures ready movement of the toggle bar to encasement in the bolt slot.

A still further advantage is provided by structure of the toggle bar once the nut has been tightened so that the locking bolt firmly holds the first beam second end and column together. As connected, holding forces are transmitted from the column web through the squarely seated toggle bar locking arm end wall. These forces then are transferred to the respective areas of contact between the toggle bar base end and bottom edge segments and the slot rear recess end and bottom walls. Distributing this holding force directly to these three contact areas reduces stress and wear of areas of engagement and minimizes stress on the pivot connection between the pin and toggle bar.

The locking bolt need not be removed and serves as a continuing locator for the unattached first end of the second beam as it is swung into place by a cable connected to a crane. While locating and attaching the second beam, stress on the locking bolt from any additional forces is distributed in a like manner.

DESCRIPTION OF THE DRAWINGS

FIG. 4 is a side elevational view, partial in section, of another embodiment of the inventive locking bolt.

FIG. 5 is an elevational view of the locking bolt as used to connect respective ends of a pair of horizontal beams to a vertical column.

DESCRIPTION OF THE PREFERRED EMBODIMENT

Figure 1:
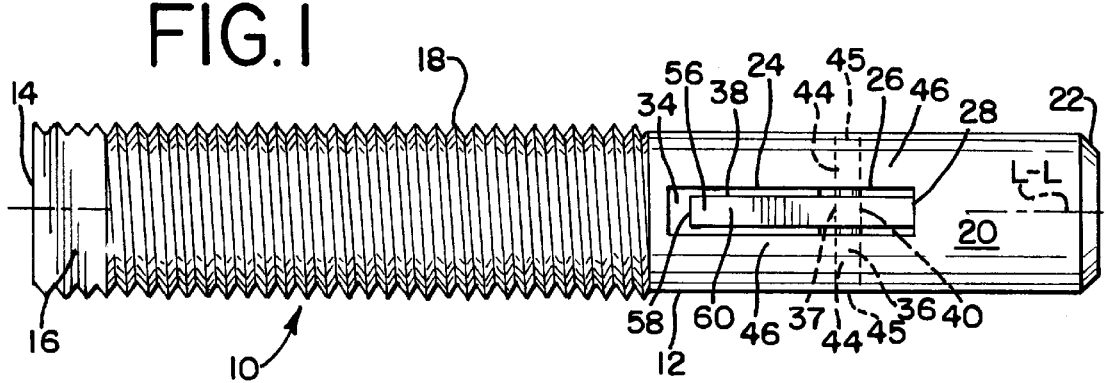
FIG. 1 is a plan view of a locking bolt of this invention.

A locking bolt of this invention is shown generally in FIG. 1 and designated 10. The bolt 10 includes an elongated, cylindrical body 12 having a rear end 14 formed with flat segments 16 that integrate with a threaded section 18. Connecting with the threaded section 18 is a smooth toggle section 20 that terminates at a rounded front end 22.

Figure 2:
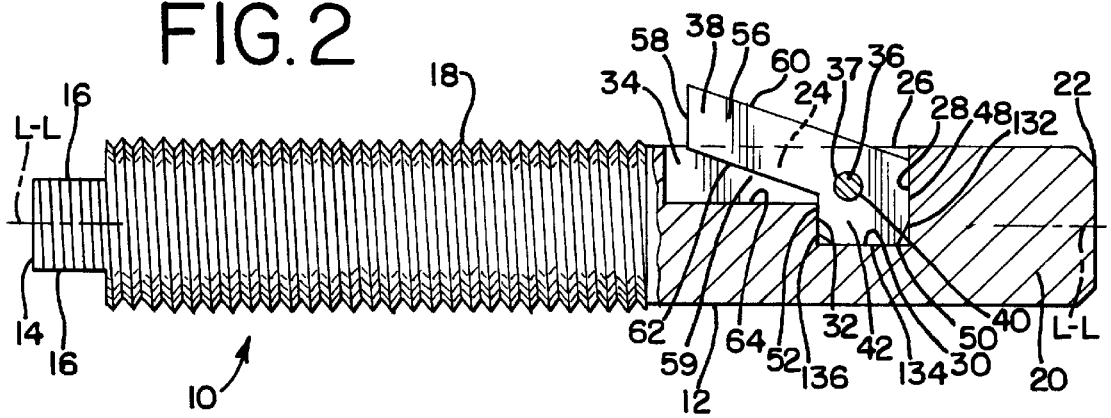
FIG. 2 is a side elevational view partially in section, of the locking bolt of FIG. 1 with a toggle bar of the bolt shown in its locking mode.

As best seen in FIGS. 1 and 2, the toggle section 20 includes a slot 24 having an inverted L-like shaped when the slot 24 faces up. The slot 24 has a deep, box-shaped front recess 26 defined by a front end wall 28, a bottom wall 30 and a rear end wall 32. This front recess 26 then connects with a shallow, rear recess 34.

Figure 3:
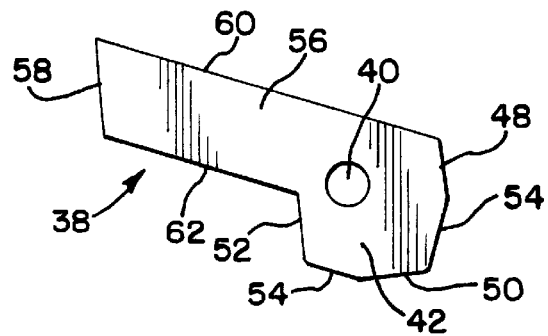
FIG 3 is a detailed side elevational view of the toggle bar.

Pivotally carried in the slot 24 by a pin 36 is a complementary shaped toggle bar 38. The pin 36 extends through an opening 40 in a base 42 of the toggle bar 38 with a loose fit 37. Respective ends 44 of the pin 36 then are press fitted in aligned apertures 45 in spaced apart sidewalls 46 of the slot 24. As best seen in FIG. 3, the toggle base 42 includes a front edge segment 48, a bottom edge segment 50, and a rear edge segment 52. These edge segments 48–52 are spaced apart by angularly offset intermediate edge sections 54.

Joining the toggle base 42 is a rearward extending locking arm 56 having a rear end edge 58 angularly offset from a top and a bottom edge 60, 62 of the locking arm 56. This locking arm rear end edge 58 is positioned parallel to the toggle bar base front and rear edge segments 48, 52 and perpendicular to the base bottom edge segment 50.

The mode of the toggle bar 38 is governed by the location of the slot 24 and effect of gravity on the toggle bar 38 as so positioned. When the slot 38 faces up, the toggle bar locking arm 58 rests in the slot rear recess 34. When the slot 38 faces down, the locking arm 58 swings out of the slot rear recess 34 so that locking arm rear end edge 58 is fully exposed.

FIG. 2 shows the rear end edge 58 fully exposed or in a locking mode 59.

A further embodiment of this inventive locking bolt is shown in FIG. 4 and designated 80. The locking bolt 80 is similar to the locking bolt 10 except the bolt 80 includes a coil spring 82 to affect positioning of its toggle bar 38. As seen in FIG. 4, a bottom wall 64 of the slot rear recess 34 of the bolt 80 has an indentation 84 to hold a bottom end 86 of the spring 82. A top end 88 of the spring 82 then engages the bottom edge 62 of the toggle bar locking arm 56 to resiliently maintain the locking arm 56 is the locking mode 59. The locking arm 56 must be manually or otherwise depressed to encase the toggle bar locking arm 56 in the slot rear recess 34.

Whether referring to the locking bolt 10 or to locking bolt 80, when the toggle bar locking arm 56 is fully encased in the slot rear recess 34, the locking arm bottom edge 62 seats on the bottom wall 64 of the rear recess 34. When the locking arm 56 swings out of this rear recess 34, toggle bar rotation, whether gravity induced or spring activated, is limited to proximately 20 degrees. Rotation is restricted by engagement of the front, bottom, and rear edge segments 48–52 of the toggle bar base 42 with the slot front recess front wall, bottom wall, and rear wall 28–32. When the toggle bar 38 in its locking mode 59, the rear end edge 58 of the locking arm 56 is positioned perpendicular to a longitudinal axis L—L of the bolt body 14.

Understanding how this inventive locking bolt, for example locking bolt 10, functions is more easily appreciated by viewing FIG. 5 and having some knowledge of the structure of a building under construction. Such a building typically has a series of vertical columns, such as a column 100 in FIG. 5, positioned in a gridlike pattern. These columns then are connected by a series of horizontal beams such as a first beam 102 and a second beam 104.

While not shown, it should be understood that a first end of the first beam 102 has been attached to an adjacent column. A second end 106 of the first beam 102 then is tentatively attached to the column 100 by inserting the locking bolt 10 through a bottom opening 108 in an attaching angle 110 on the first beam second end 106 and a lower opening 112 in a web 114 of the column 100. The rounded front end 22 and smooth toggle section 20 of the bolt body 12 ease insertion. Additionally, the shallow angle of incidence between the toggle bar locking arm top edge 60, assuming the toggle bar 38 is spring activated or bolt body slot 24 faces downs and the attaching angle opening 108 minimizes resistance to insertion. This shallow angle of attack produces minimal resistance to forward bolt movement as the locking arm 56 is being pressed into the slot rear recess 34.

Once the rear end edge 58 of the bolt toggle bar locking arm 56 is clear of a second side 116 of the column web 114, the locking arm 56 returns to its locking mode 59. Note, that where the bolt slot 24 faces up during insertion, it is necessary to rotate the bolt 10 one-half turn. The flat segments 16 on the bolt rear end 14 facilitate such rotation with a wrench. A nut 118 on the bolt threaded section 18 then is tightened to pull the first beam second end 106 and the column web 118 together. As pulled together, top openings 124 in the first beam attaching angle 110 and an upper openings 126 in the column web 114 come into alignment.

Next, the second beam 104 is roved into place by a crane with initial positioning obtained by a worker held spud wrench (not shown) extending through one of the first bean attaching angle top openings 124 and the now aligned web upper opening 126. The crane maneuvers the second beam 104 so that a top opening 124 in a further attaching angle 110 on a first end 128 of the second beam 104 fits about an end of the spud wrench. A nut-bolt assembly 130, see FIG. 5, then is placed in the both other top openings 124 in the attaching angles 110 on respective ends of beans 102, 104 and the column web opening 126. Next, stud wrench is removed and replaced with a further nut-bolt assembly 130. Finally, the locking bolt 10 is withdrawn and replaced with a further nut-bolt assembly (not shown). As noted above, use of the locking bolt 10 eliminates the need for the worker to reach to column web side 116 to unscrew a nut from a bolt theretofore in web opening 112 before the second column first end 128 can be attached to the column 100.

When the locking bolt 20 is used in the beam-column connecting procedure described above, the toggle bar 38 is subjected to multiple forces, in particular when the toggle bar 38 is in its locking mode 59. Typically, these operative forces are substantial because of the size and weight of the structural members being moved about for joinder and then by the force required to establish a stable beam-column connection. Once joined, the connecting forces primarily are transmitted from the column web 114 through the squarely seated arm rear end edge 58 to the bolt toggle bar locking arm 56. Because the locking arm 56 also is angularly offset, these forces divide into a major longitudinal force component in a direction parallel to the bolt L—L axis and a minor force component in a direction perpendicular to the L—L axis. These forces additionally produce a rotational moment. The major force component produces stress in a front contact area 132 between the toggle bar base front edge 48 and the slot deep recess front wall 28. The minor force component produces stress in a bottom contact area 134 between the toggle bar base bottom edge 50 and the slot deep recess bottom wall 30. The rotational moment produces stress in the above contact areas 132, 134 and a rear contact area 136 between the toggle bar base rear edge segment 52 and the slot deep recess rear end wall 32. Note that the loose fit 37 between the pivot pin 36 and the toggle bar base opening 40 promotes wall-edge segment seating in these contact areas 132–136 and limits pivot pin stress. Because these contact areas 132–136 have substantial size, induced stress remains below a level that could produce deformation or extraordinary wear.

While embodiments, uses, and advantages of this inventive locking bolt have been shown and described, it should be understood that this invention is limited only by the scope of the claims. Those skilled in the art will appreciate that various modifications or changes may be made without departing from the scope and spirit of the invention, and these modifications and changes may result in further uses and advantages.

What I claim is:

1. A bolt particularly adapted to facilitate making connections between structural members of a building under construction, said bolt comprising:

an elongated body, a toggle section at a front end of said body, a slot in said toggle section, a toggle bar pivotally carried in said slot, said toggle bar comprising a base joined to a locking arm with edge segments of said toggle bar base and walls of said slot forming a box-like shaped contact area upon said toggle bar rotating to a locking mode, said slot having a deep front recess connecting with a shallow rear recess, and said slot walls being a spaced apart front and rear end wall and a connecting bottom wall of said front recess, wherein connecting forces on said bolt are transmitted through said toggle bar locking arm to said contact area where resulting stress is limited to said contact area.

2. A bolt as defined by claim 1 and further characterized by, an indentation formed in a bottom wall of said slot rear recess, a spring having a bottom end disposed in said indentation and a top end in contact with a bottom edge of said toggle bar locking arm, wherein said spring resiliently maintains said toggle bar in said locking mode.

3. A bolt as defined by claim 1 and further characterized by, said toggle bar base edge segments forming said contact area being a front edge segment, a bottom edge segment, and a rear edge segment with said edge segments being spaced apart by intermediate edge sections.

4. A bolt as defined by claim 3 and further characterized by, said bolt body including a threaded section positioned between a rear end of said bolt and said toggle section, and flat segments formed on opposite sides of said threaded section, wherein said flat segments are prepared for engagement by a wrench to rotate said bolt.

5. A bolt as defined by claim 3 and further characterized by, said toggle bar locking arm having a rear end edge positioned proximately parallel to said toggle bar base front and rear edge segments and perpendicular to said toggle bar base bottom edge segment.

6. A bolt as defined by claim 5 and further characterized by, said toggle bar locking arm rear end edge being positioned proximately perpendicular to a longitudinal axis of said bolt with said toggle bar in said locking mode.

7. A bolt as defined by claim 3 and further characterized by, said toggle bar locking arm being angularly offset by about 20 degrees with said locking arm in said locking mode.

8. A locking bolt particularly adapted to simplify joinder of structural beams to a structural column of a building under construction, said locking bolt comprising:

a elongated body having a threaded rear and section connecting with a smooth front end section, a slot in said toggle section defined by a deep front recess connecting with a shallow rear recess, and a toggle bar having a base joined to locking arm with said toggle bar base pivotally carried in said deep recess and said locking arm in said shallow recess and said toggle bar base having spaced apart edge segments forming contact areas with walls of said slot with said toggle bar in a locking mode, wherein, with said toggle bar in said locking mode, forces from said joinder of said beam to said column are transmitted by said toggle bar through said contact areas to said slot with resulting stress being limited to said contact areas.

9. A locking bolt to simplify forming connections between structural members such as beams and columns, said locking bolt comprising:

an elongated cylindrical body having a smooth front toggle section joined to a rear threaded section, gripping means formed on said threaded section to promote bolt rotation, a slot formed in said toggle section, said slot having a deep front recess connecting with a shallow rear recess with said deep recess including spaced apart front and rear end walls connecting with a bottom wall, a toggle bar carried in said slot by a loose pivot connection formed with said toggle section, said toggle bar having a locking arm connecting with a base with said base defined in apart by spaced apart front and rear edge segments and a connecting bottom edge segment, and contact areas forming between said slot front recess walls and said toggle bar base edge segments upon said toggle bar locking arm swinging to a locking mode and engaging a side of said structural member with said contact areas positioned to maintain said toggle bar pivot connection substantially stress free.

10. A bolt for use in construction of a building formed of structure steel columns and beams, said bolt comprising:

a cylindrical-like shaped body having a toggle section, a longitudinal slot in said toggle section, said slot having a set of spaced apart walls, and a toggle bar having a base connecting to a locking arm, said base having a set of edge segments spaced about a loose pivot connection joining said base to said bolt body, and said pivot connection allowing said toggle bar to swing to a locking mode wherein said locking arm extends from said slot with said bar movement being limited by said set of base edge segments seating against said set of walls of said slot, wherein, during use of said bolt in said locking mode, said loose pivot connection accommodates wear of said toggle bar base edge segments and said slot walls to remain substantially stress-free.

\* \* \* \* \*